(12) United States Patent
Worthington et al.

(10) Patent No.: US 6,337,468 B1
(45) Date of Patent: Jan. 8, 2002

(54) RAPID RECOVERY OVEN CONTROL AND METHOD

(75) Inventors: Timothy Worthington; Steven J. Gray, both of Louisville; Douglas A. Able, Shelbyville; Brian P. Lenhart, Jr., Prospect, all of KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/351,838
(22) Filed: Jul. 13, 1999

Related U.S. Application Data

(60) Provisional application No. 60/092,817, filed on Jul. 14, 1998.

(51) Int. Cl.[7] .................................................. H05B 1/02
(52) U.S. Cl. ..................... 219/497; 219/506; 219/413; 219/508; 99/331
(58) Field of Search ................................ 219/483–486, 219/411–414, 506, 501, 508, 497, 499, 494; 99/325–335

(56) References Cited

U.S. PATENT DOCUMENTS

| | | | | |
|---|---|---|---|---|
| 4,282,423 A | * | 8/1981 | Volz | 219/490 |
| 4,913,038 A | * | 4/1990 | Burkett et al. | 99/331 |
| 5,038,676 A | * | 8/1991 | Davis et al. | 99/330 |
| 5,528,017 A | * | 6/1996 | Wolff | 219/501 |
| 5,767,488 A | * | 6/1998 | Barger et al. | 219/492 |

* cited by examiner

Primary Examiner—Mark Paschall
(74) Attorney, Agent, or Firm—Armstrong Teasdale LLP

(57) ABSTRACT

Apparatus and methods for controlling operation of an oven by differentiating between normal temperature cycling and an abnormal event in which the temperature drifts substantially below the lower band limit are described. Such differentiation enables use of differentiated modes to bring the oven temperature back to within a tolerance band or range. Particularly, and in connection with an oven including a microcomputer, a relatively low heat rate mode is used to maintain the oven temperature within the tolerance band or range, and a relatively high heat rate mode is utilized to return the oven temperature back to within the tolerance band or range quickly if the temperature drops below a lower set limit indicative of the occurrence of a drift event. The microcomputer is programmed so that after completion of preheating, the oven temperature is controlled by the user set temperature and offsets. Power cycling of the bake and broil heaters is controlled according to timing defined by prestored parameters. In the event that the temperature in the oven cooking cavity drops below the lower set limit, rapid recovery is initiated.

20 Claims, 2 Drawing Sheets

RAPID RECOVERY OVEN CONTROL AND METHOD

CROSS-REFERENCE TO RELATED APPLICATIONS

This application claims the benefit of U.S. Provisional Application No. 60/092,817, filed Jul. 14, 1998.

BACKGROUND OF THE INVENTION

This invention relates generally to ovens and more particularly, to apparatus and methods for controlling oven operation in response to temperature drift.

Some known ovens include microcomputers that typically utilize single level logic to control the oven temperature. The microcomputer energizes and deenergizes the oven bake and broil heating elements based on simple thermostat temperature set point limits. That is, the oven microcomputer uses the oven set point temperature plus an overshoot allowance to trigger deenergization of the bake and broil heating elements, and the microcomputer uses the oven set point temperature minus an undershoot allowance to trigger energization of the bake and broil heating elements. The temperature band defined by the set point limits may be referred to as the tolerance band.

If the oven door is opened, the oven temperature, i.e., the temperature in the oven cooking cavity, falls substantially below the tolerance band. Such events which result in the oven temperature falling substantially below the lower limit of the tolerance band are sometimes referred to herein as drift events. The occurrence of numerous drift events, particularly if the cooking operation requires a lengthy cook time, e.g., 30 minutes or more, can adversely affect oven operations in that even though an operator may expect that a food item will be completely cooked at the end of the timed period, the food item may not be completely cooked since the selected oven temperature was not maintained throughout the cooking operation.

It would be desirable to control oven operations so that upon the completion of a timed cooking operation, the food item is likely to be completely cooked even if numerous drift events occur during the operation. Of course, in providing such control, the cost and complexity of the oven should not be significantly increased.

BRIEF SUMMARY OF THE INVENTION

In an exemplary embodiment of the invention, an oven controller differentiates between normal temperature cycling and a drift event in which the temperature drops below a lower set limit, sometimes referred to herein as the rapid recovery entry temperature. Such differentiation enables the oven microcomputer to use differentiated heating modes to rapidly bring the oven temperature back to within a tolerance band or range upon the occurrence of a drift event.

Particularly, and in connection with an oven including a microcomputer, a relatively low heat rate mode is used to maintain the oven temperature within the tolerance band or range during normal operations. Upon the occurrence of a drift event, e.g., opening of the oven door, causing the temperature to fall below the lower set limit, a relatively high heat rate mode is utilized to quickly return the oven temperature back to within the tolerance band or range.

In one specific embodiment, the microcomputer is programmed so that during operation in the normal bake mode, the oven temperature is controlled by the user set point temperature and offsets. Power cycling of the bake and broil heaters is controlled according to timing defined by pre-stored parameters for the normal bake mode. If the temperature in the oven cooking cavity drops below the lower set limit, e.g., the user set temperature minus a rapid recovery offset, rapid recovery is initiated. In the rapid recovery mode, the bake heating element is energized at a 100% duty cycle to quickly raise the oven temperature back within the tolerance range.

The rapid recovery mode facilitates operation of an oven so that upon the completion of a timed cooking operation, the food item is likely to be completely cooked even if numerous drift events occur during the operation. In addition, such rapid recovery can be implemented with components currently utilized in known ovens and without much additional cost.

DETAILED DESCRIPTION OF THE INVENTION

Figure 1:
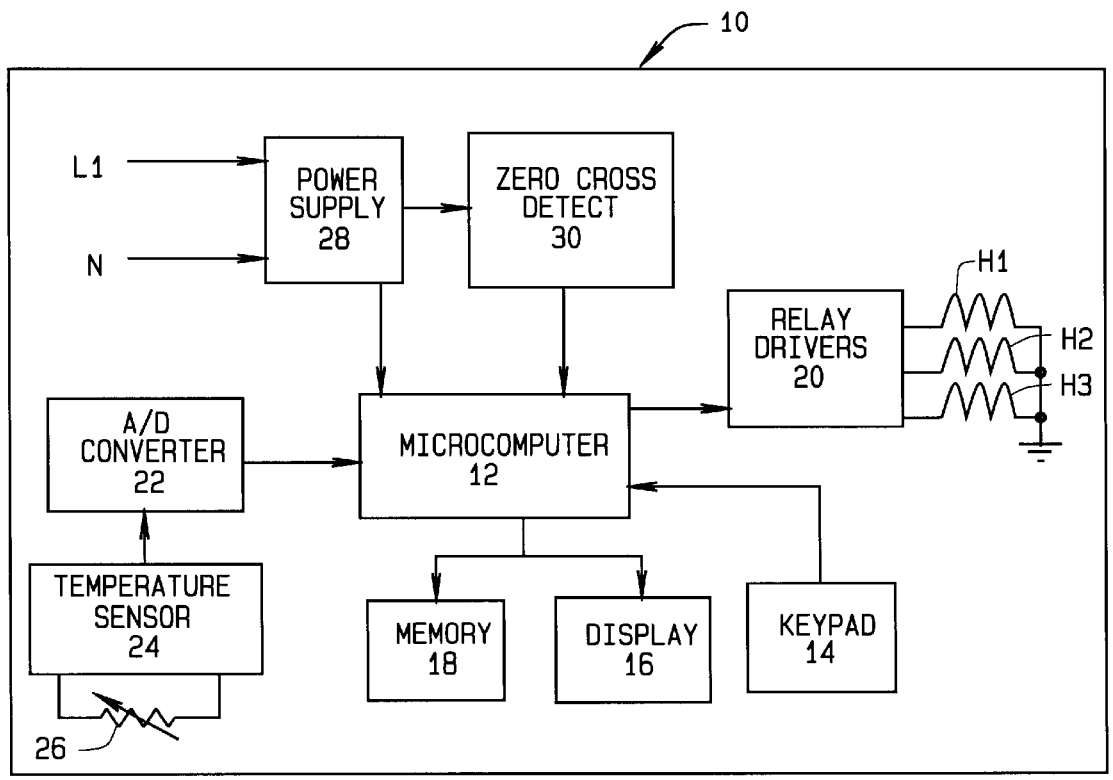
FIG. 1 is a block diagram of an oven control in accordance with one embodiment of the present invention.

FIG. 1 is a block diagram of an oven control 10 for an oven in accordance with one embodiment of the present invention. The oven may, for example, be a thermal or convection type oven. Oven control 10 includes a microcomputer 12 coupled to a keypad 14 and a display 16. An operator may input instructions to microcomputer 12 via keypad 14, and certain messages and data are displayed by microcomputer 12 on display 16. For example, the remaining time in a cooking cycle may be displayed by microcomputer 12 on display 16. A memory 18 also is coupled to microcomputer 12. Memory 18 may, for example, be an electronically erasable programmable read only memory (EEPROM). Calibration values for thermostat calibration and parameters, for example, are stored in memory 18.

Microcomputer 12 also is coupled to relay drivers 20 which control energization and deenergization of heating elements H1, H2, and H3. Instructions input by an operator at keypad 14 are utilized by microcomputer 12 controlling operation of heating elements H1, H2, and H3 via relay drivers 20. Selected ones of heating elements H1, H2, and H3 are utilized, for example, in the bake, broil, and clean modes of operation. Temperature representative signals are provided, via an analog to digital converter 22, to microcomputer 12 by temperature sensor 24. Sensor 24 includes a variable resistor 26 responsive to temperature changes. Resistor 26 is located in or adjacent to the oven cooking cavity. Microcomputer 12 utilizes the temperature data from sensor 24 to determine whether the desired oven operation is being achieved.

Power is supplied to microcomputer 12 from a power supply 28 which is configured to be coupled to power lines L1 and N. Power supply 28 also is coupled to a zero cross detect circuit 30 which, as is well known in the art, generates timing pulses upon detection of zero crossing of the AC power signal. The timing pulses are supplied to microcomputer 12 and utilized by microcomputer 12 in a manner well known in the art.

Figure 2:
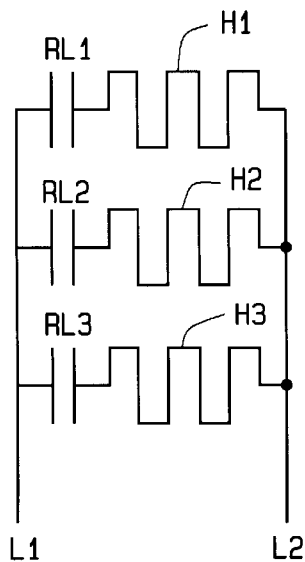
FIG. 2 is a simplified circuit schematic of a circuit for controlling energization and deenergization of the oven heating elements.

FIG. 2 is a simplified circuit schematic of relay drivers 20 for controlling energization and deenergization of the heating elements H1, H2, and H3. Relays RL1, RL2, and RL3 are electrically connected in series with respective heating elements H1, H2, and H3. Heating elements H1, H2, and H3 are controlled by controlling the state of relays RL1, RL2, and RL3. The state of relays RL1, RL2, and RL3 is controlled by microcomputer 12.

Oven control 10 is an illustrative oven control and the present invention is not limited to practice in connection with only oven control 10. The present invention could be utilized in many alternative oven configurations. The oven in which such oven control could be implemented could, for example, be a thermal or convection oven commercially available from General Electric Company, Louisville, Ky., 40225. Such ovens may be modified to incorporate the rapid recovery mode described below in more detail.

Generally, and in one aspect, the present control relates to differentiating between normal temperature cycling and an abnormal or drift event in which the temperature drops below a lower limit. Such differentiation enables use of differentiated modes to bring the oven temperature back to within the tolerance band or range. Particularly, a relatively low heat rate mode is used to maintain the oven temperature within the tolerance band or range during normal operation, and a relatively high heat rate mode is utilized to return the oven temperature back to within the tolerance band or range quickly if the temperature falls below a lower set limit. Such operation is sometimes referred to herein as the "rapid recovery".

In the bake mode, for example, an oven may be controlled to operate in a range between 170 to 550 deg F. The bake temperature is selected by a user rotating a knob on the control panel. The bake heating mode begins with repaid preheating of the oven cavity. During preheat, the bake and broil heating elements are energized through a sequence of controlled times. Preheating continues until the signal from oven temperature sensor 24 reaches the preheating temperature or until microcomputer 12 completes its control sequence.

After the completion of preheating, the oven temperature is controlled by the user set temperature and offsets. Power cycling of the bake and broil heaters is controlled according to timing defined by parameters stored in memory 18. Generally, oven control 10 continuously monitors the oven temperature and compares the oven temperature to the user selected temperature. When the actual temperature equals or exceeds a determined temperature Toff, the control deenergizes the bake and broil heat relays. The control continues to monitor the oven temperature until the actual temperature is less than Toff - Tamplitude, and when this occurs, the control begins relay cycling. Toff for bake is equal to:

Tset+Factory Offset+User Adjustable Offset.

Tset is the selected knob temperature. Factory Offset is a factory determined value to compensate for the difference between the actual temperature at the center of the oven cavity and the temperature sensed by the temperature sensor. User Offset is a user adjustable offset that ranges from –35 to +35 deg F in 5 deg F increments. The maximum value for Toff for bake is 575 deg F. If the calculated value for Toff is greater than 575 deg F, Toff is set to 575 deg F. Tamplitude is a fixed temperature change between the relay turn on temperature and the relay turn off temperature for the bake, broil, and clean set points. The temperature at which control 10 begins cycling, Ton, for bake is equal to:

Tset+Factory Offset+User Adjustable Offset - Tamplitude.

The minimum value for Ton f or bake is 170 deg F. If the calculated value is less than 170 deg F, Ton is set at 170 deg F, and Toff is set to 170 deg F plus Tamplitude.

In accordance with the present invention, an additional low threshold temperature, designated the rapid recovery threshold temperature, is provided, which is below the normal Toff threshold, and the control is arranged to initiate a rapid recovery operating mode which differs from the normal bake mode, when the sensed oven temperature drops below this rapid recovery threshold temperature. The additional offset temperature is selected to provide a rapid recovery threshold temperature which is sufficiently lower than the Toff threshold, that the oven temperature would only drop below this value because of the occurrence of an abnormal event, such as the opening of the oven door. The rapid recovery operating mode facilitates the return of the oven temperature to within the tolerance band following such an event, more rapidly than would occur if the control continued to operate in the normal bake mode. In one embodiment of the invention, during the rapid recovery mode, the bake element is operated at 100% duty cycle until the temperature is restored to the rapid recovery termination threshold temperature which may be below the tolerance band for the selected setpoint temperature (to prevent overshoot), but which is sufficiently close to facilitate the aforementioned rapid return to within the tolerance band.

Figure 3:
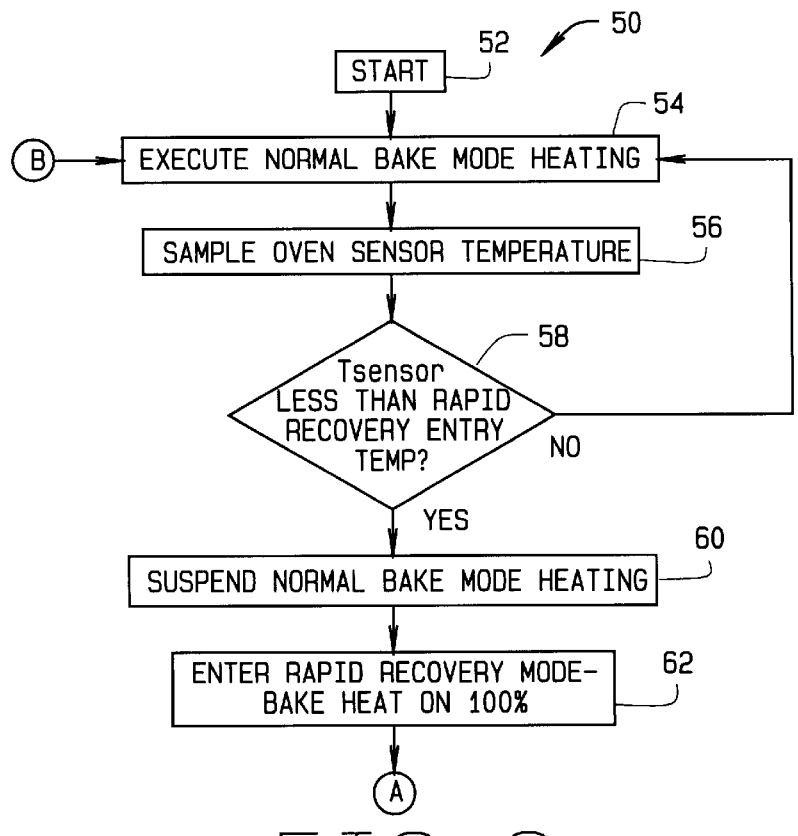
FIGS. 3 and 4 are a flow chart illustrating oven control in accordance with one embodiment of the present invention.
Figure 4:
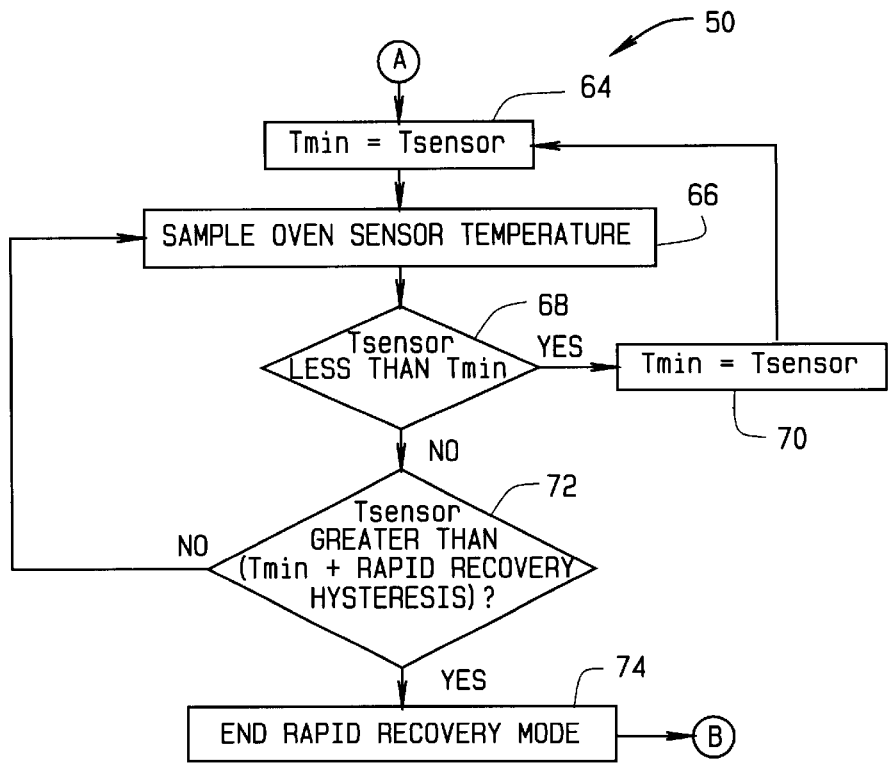

FIGS. 3 and 4 are a flow chart 50 illustrating an exemplary embodiment of process steps for performing such rapid recovery oven control. The control algorithm is executed by microcomputer 12 and may be stored in memory or on-board microcomputer in an on-board read only memory or in firmware. Generally, once operations are initiated 52, and if the bake mode is selected by the user at the control panel, microcomputer 12 performs normal bake mode heating 54. Microcomputer 12 also samples 56 oven temperature sensor 24, via converter 22, to determine whether the oven temperature is within the tolerance range. If the sensed temperature is greater than the rapid recovery entry temperature 58, which may be preselected and stored in memory 18, operations continue in the normal bake mode.

If the sensed temperature is less than the rapid recovery temperature, then microcomputer 12 suspends normal bake mode heating 60 and enters the rapid recovery mode 62. In the rapid recovery mode, the bake heating element is energized using a duty cycle different from the bake heating element duty cycle used in normal bake operations, such as a 100% duty cycle, i.e., there is no relay cycling during the rapid temperature recovery mode. Operations continue, as indicated by connector A, to the process steps illustrated in FIG. 4.

Referring now to FIG. 4, and proceeding with operations from connector A, at 64, microcomputer 12 sets the variable Tmin equal to the temperature sensed by oven temperature sensor (Tsensor) 24. The loop comprising blocks 66, 68 and 70 operate to determine the minimum temperature which occurs in the oven as a result of a drift event.

After initially setting Tmin equal to Tsensor at 64, microcomputer 12 then obtains, or samples, data from converter 22 to determine the current oven temperature 66. If the temperature Tsensor is less than Tmin 68, the oven temperature has dropped further since the last check. That is, if Tsensor minus Tmin is negative, then a new absolute sensor minium Tmin has been found. Accordingly, Tmin is set to equal Tsensor 70 and processing returns to step 66.

If the value of Tsensor is not less than Tmin, the oven temperature has either not changed or has increased since the last check indicating the minimum has been detected.

Microcomputer 12 then determines whether the value of Tsensor is greater than the value of (Tmin+rapid recovery hysteresis) 72. If no, then the oven temperature has not yet been sufficiently raised to terminate the rapid recovery mode and processing returns to step 66. If yes, then the oven temperature has been sufficiently raised and microcomputer 12 exits the rapid recover mode 74. As indicated by connector B, microcomputer 12 then continues executing the normal bake mode heating routine as shown in FIG. 3.

In one specific exemplary embodiment, the rapid temperature recovery mode can only be entered once the oven is operating in the normal bake mode and the oven sensor temperature has reached the value for Toff. If the oven sensor temperature drops below the rapid recovery entry temperature, or threshold, then normal bake cycling is suspended and the rapid temperature recovery mode is entered. To exit the rapid temperature recovery mode, the oven control continuously monitors the oven sensor temperature. When the oven sensor temperature rises above the rapid recovery exit temperature value, the oven control re-enters the normal bake mode heating cycle. The oven control will not then reenter the rapid temperature recovery mode until the oven sensor temperature rises to the Toff temperature.

More specifically, and in the embodiment described above, the rapid recovery entry temperature is equal to (Ton−rapid temperature recovery entry offset), where the rapid temperature recovery entry offset is an adjustable parameter that ranges from 0 to+255 deg F in 1 deg F increments. To exit the rapid temperature recovery mode, the current sensor temperature minus Tmin must be equal to or greater than the rapid temperature recovery hysteresis constant. The hysteresis constant is an adjustable parameter that ranges from 0 to 63 deg F in 1 deg F increments.

The rapid recovery entry temperature and the rapid temperature recovery hysteresis constant are adjustable in that such parameters are stored in memory 18, which as described above may be an electronically erasable read only memory (EEPROM). The parameter values can be easily changed by the control manufacturer or appliance manufacturer by reprogramming the EEPROM. The actual values selected for the parameters depend upon, for example, the size of the oven and are determined through testing. In setting the hysteresis constant, for example, the amount of overshoot that occurs at different temperatures as well as avoiding overheating the oven materials due to the 100% duty cycle are considered. Values on the order of 100 deg F and 10 deg F has been found to provide satisfactory results for the rapid temperature recovery entry offset and the hysteresis constant in at least one known oven configuration. Again, the actual settings for these parameters may vary from oven to oven depending upon the specific oven configuration.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A controller for an oven, the oven including a cooking cavity and a temperature sensor for sensing the temperature in the cooking cavity, at least one heating element positioned to heat the cooking cavity, said controller programmed to:

operate the at least one heating element in a normal bake mode;

compare the temperature in the cooking cavity as sensed by the temperature sensor in the normal bake mode to a rapid recovery entry temperature; and if the temperature in the cooking cavity is less than the rapid recovery entry temperature, then enter a rapid recovery mode.

2. A controller in accordance with claim 1 wherein said rapid recovery mode comprises the step of energizing the heating element at duty cycle different from the duty cycle of the heating element during normal operations.

3. A controller in accordance with claim 2 wherein in the rapid recovery mode, said controller causes the heating element to be energized at a 100% duty cycle.

4. A controller in accordance with claim 1 wherein the rapid recovery mode comprises the steps of:

energizing the heating element;

determining whether the oven cavity temperature has reached at least a minimum temperature.

5. A controller in accordance with claim 4 wherein the rapid recovery mode further comprises the step of if the oven cavity temperature has reached at least a minimum temperature, then exiting the rapid recovery mode.

6. A controller in accordance with claim 4 wherein the rapid recovery mode further comprises the step of if the oven cavity temperature has not reached at least a minimum temperature, then continuing operation in the rapid recovery mode.

7. A method for operating an oven, the oven including a cooking cavity and a temperature sensor for sensing the temperature in the cooking cavity, at least one heating element positioned to heat the cooking cavity, said method comprising the steps of:

operating the oven in a normal bake mode;

comparing the temperature in the cooking cavity as sensed by the temperature sensor in the normal bake mode to a rapid recovery entry temperature; and if the temperature in the cooking cavity is less than the rapid recovery entry temperature, then entering a rapid recovery mode.

8. A method in accordance with claim 7 wherein the rapid recovery mode comprises the step of energizing the heating element at duty cycle different from the duty cycle of the heating element during normal operations.

9. A method in accordance with claim 8 wherein in the rapid recovery mode, the heating element is energized at a 100% duty cycle.

10. A method in accordance with claim 7 wherein the rapid recovery mode comprises the steps of:

energizing the heating element;

determining whether the oven cavity temperature has reached at least a minimum temperature.

11. A method in accordance with claim 10 wherein the rapid recovery mode further comprises the step of if the oven cavity temperature has reached at least a minimum temperature, then exiting the rapid recovery mode.

12. A method in accordance with claim 10 wherein the rapid recovery mode further comprises the step of if the oven cavity temperature has not reached at least a minimum temperature, then continuing operation in the rapid recovery mode.

13. An oven comprising a controller, a cooking cavity, and a temperature sensor for sensing the temperature in said cooking cavity, at least one heating element positioned to heat said cooking cavity, said controller being operative to implement a normal bake mode and to compare the temperature in said cooking cavity as sensed by said temperature sensor to a rapid recovery entry temperature, and if the temperature in said cooking cavity is less than the rapid recovery entry temperature, then entering a rapid recovery mode.

14. An oven in accordance with claim 13 wherein said rapid recovery mode comprises the step of energizing said heating element at duty cycle different from the duty cycle of said heating element during the normal bake mode.

15. An oven in accordance with claim 14 wherein in said rapid recovery mode, said controller causes said heating element to be energized at a 100% duty cycle.

16. An oven in accordance with claim 13 wherein said rapid recovery mode comprises the steps of:

energizing said heating element;

determining whether said oven cavity temperature has reached at least a minimum temperature.

17. An oven in accordance with claim 16 wherein said rapid recovery mode further comprises the step of if said oven cavity temperature has reached at least a minimum temperature, then exiting said rapid recovery mode.

18. An oven in accordance with claim 16 wherein said rapid recovery mode further comprises the step of if said oven cavity temperature has not reached at least a minimum temperature, then continuing in said rapid recovery mode.

19. An oven in accordance with claim 13 wherein said temperature sensor comprises an analog to digital converter.

20. An oven in accordance with claim 13 wherein said heating element comprises a bake heating element.

* * * * *